(12) United States Patent
Correnti

(10) Patent No.: US 10,474,904 B1
(45) Date of Patent: Nov. 12, 2019

(54) SYSTEM AND METHOD FOR PARKING A VEHICLE IN A CAMERA'S FIELD OF VIEW

(71) Applicant: Alarm.com Incorporated, Tysons, VA (US)

(72) Inventor: Matthew Daniel Correnti, Reston, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/149,096

(22) Filed: Oct. 1, 2018

Related U.S. Application Data

(60) Provisional application No. 62/566,317, filed on Sep. 30, 2017.

(51) Int. Cl.
| | | |
|---|---|---|
| H04N 7/18 | (2006.01) | |
| G06K 9/00 | (2006.01) | |
| G06T 7/70 | (2017.01) | |
| H04N 5/232 | (2006.01) | |
| B60Q 9/00 | (2006.01) | |
| G05D 1/02 | (2006.01) | |
| H04N 5/247 | (2006.01) | |
| B60R 25/30 | (2013.01) | |
| B60R 25/10 | (2013.01) | |

(52) U.S. Cl.
CPC ......... *G06K 9/00771* (2013.01); *B60Q 9/002* (2013.01); *G06T 7/70* (2017.01); *H04N 5/23206* (2013.01); *B60R 25/10* (2013.01); *B60R 25/305* (2013.01); *G05D 1/021* (2013.01); *G06K 2209/23* (2013.01); *G06T 2207/30232* (2013.01); *G06T 2207/30252* (2013.01); *H04N 5/247* (2013.01)

(58) Field of Classification Search
CPC ...... H04N 5/247; H04N 7/18; H04N 5/23206; G06K 9/00771; G06K 2209/23; G06T 2207/30264; G06T 2207/30232; G06T 7/70; G06T 2207/30252; B60R 25/10; B60R 25/305; G05D 1/021; B60Q 9/002
USPC ...... 348/143, 148, 113, 116, 118; 340/932.2, 340/988, 995.25
See application file for complete search history.

(56) References Cited

U.S. PATENT DOCUMENTS

| | | | | |
|---|---|---|---|---|
| 2003/0058337 A1 * | 3/2003 | Tanaka | ................... | B60Q 9/005 348/116 |
| 2014/0375804 A1 * | 12/2014 | Bulan | ...................... | H04N 7/18 348/148 |
| 2017/0232890 A1 * | 8/2017 | Lewis | ...................... | G06T 7/13 348/148 |

* cited by examiner

*Primary Examiner* — Sherrie Hsia
(74) *Attorney, Agent, or Firm* — Fish & Richardson P.C.

(57) ABSTRACT

Methods, systems, and apparatus, including computer programs encoded on a storage device, for parking a vehicle in a camera's field of view. The method may include actions of determining that a vehicle is parked within a predetermined distance of a property, obtaining data from a monitoring system component, determining, based on the obtained data, that the vehicle is not parked within a field of view of a camera, determining that (i) the vehicle should be parked within a field of view of the camera and (ii) that an image captured by the camera should include a representation of the vehicle, and performing an operation to instigate movement of the vehicle to a different location that is (i) within a field of view of a camera and (ii) where an image captured by the camera includes a representation of the vehicle.

20 Claims, 4 Drawing Sheets

SYSTEM AND METHOD FOR PARKING A VEHICLE IN A CAMERA'S FIELD OF VIEW

CROSS-REFERENCE TO RELATED APPLICATION

This application claims the benefit of U.S. Provisional Patent Application No. 62/566,317 filed Sep. 30, 2017 and entitled "System And Method For Parking A Vehicle In A Camera's Line Of Sight," which is incorporated herein by reference in its entirety.

BACKGROUND

A monitoring system may be installed in a property. The monitoring system may include one or more cameras, sensors, or detectors. A monitoring system control unit can analyze data generated by the one or more cameras, sensors, or detectors and determine whether a potential event has occurred. Events that a monitoring system may detect, based on the data from the one or more cameras, sensors, or detectors may include break-ins, fires, floods, gas leaks, water leaks, or the like.

SUMMARY

According to one innovative aspect of the present disclosure, a system for parking vehicles in a camera's field of view. The monitoring system may include one or more processors; and one or more storage devices, the one or more storage devices storing instructions that, when executed by the one or more processors, cause the one or more processors to perform operations may include determining, by the monitoring system, whether a vehicle is parked within a predetermined distance of a property, based on determining, by the monitoring system, that the vehicle is parked within a predetermined distance of the property: obtaining, by the monitoring system, data from one or more monitoring system components, determining, by the monitoring system and based on the obtained data, whether the vehicle is parked within a field of view of one or more cameras, and based on determining, by the monitoring system and based on the obtained data, that the vehicle is not parked within a field of view of the one or more cameras: determining, by the monitoring system, whether (i) the vehicle should be parked within a field of view of the one or more camera and (ii) an image captured by the one or more cameras includes a representation of the vehicle, and based on determining, by the monitoring system, that (i) the vehicle should be parked within a field of view of the one or more cameras and (ii) an image captured by the one or more cameras includes a representation of the vehicle, performing, by the monitoring system, one or more operations to instigate movement of the vehicle to a different location that is (i) within a field of view of the one or more cameras and (ii) where an image captured by the one or more cameras includes a representation of the vehicle.

Other aspects include corresponding methods, apparatus, and computer programs to perform actions of methods defined by instructions encoded on computer storage devices.

These and other versions may optionally include one or more of the following features. For instance, in some implementations, determining, by the monitoring system, whether (i) the vehicle should be parked within a field of view of the one or more camera and (ii) an image captured by the one or more cameras includes a representation of the vehicle may include determining, by the monitoring system, whether the vehicle is parked in a secure location of property, and based on determining, by the monitoring system, that the vehicle is parked in a secure location of the property, determining (i) that the vehicle is not to be parked within a field of view of the one or more cameras and (ii) that an image captured by the one or more cameras includes a representation of the vehicle.

In some implementations, determining, by the monitoring system, whether (i) the vehicle should be parked within a field of view of the one or more camera and (ii) that an image captured by the one or more cameras includes a representation of the vehicle may include determining, by the monitoring system, whether the vehicle is parked in a secure location of the property, and based on determining, by the monitoring system, that the vehicle is not parked in a secure location of the property, determining (i) that the vehicle is to be parked within a field of view of the one or more camera and (ii) that an image captured by the one or more cameras includes a representation of the vehicle.

In some implementations, the secure location of the property may include a garage.

In some implementations, the operations may further include obtaining additional data from one or more monitoring system components, determining, based on the additional data, whether the vehicle is parked within a field of view of one or more cameras, and based on determining, by the monitoring system and based on the additional data, that the vehicle is not parked within a field of view of the one or more cameras: determining, by the monitoring system and based on the additional data, whether an image captured by the one or more cameras should include a representation of the vehicle, and based on determining, by the monitoring system and based on the additional data, that an image captured by the one or more cameras should not include a representation of the vehicle, determining, by the monitoring system, to not use the one or more cameras to monitor the parked vehicle.

In some implementations, the operations may further include obtaining additional data from one or more monitoring system components, determining, based on the additional data, whether the vehicle is parked within a field of view of one or more cameras, and based on determining, by the monitoring system and based on the additional data, that the vehicle is parked within a field of view of the one or more cameras: determining, by the monitoring system and based on the additional data, whether an image captured by the one or more cameras should include a representation of the vehicle, and based on determining that an image captured by the one or more cameras should include a representation of the vehicle, determining, by the monitoring system, to use the one or more cameras to monitor the parked vehicle.

In some implementations, the operations may further include using the one or more cameras to monitor the vehicle, wherein using the one or more cameras to monitor the vehicle comprises using the one or more cameras to capture one or more videos or images of the vehicle while the vehicle is parked.

In some implementations, the operations may further include obtaining additional data from one or more monitoring system components, determining, based on the additional data, whether the vehicle is parked within a field of view of one or more cameras, and based on determining, by the monitoring system and based on the additional data, that the vehicle is parked within a field of view of the one or more cameras: determining, by the monitoring system and based on the additional data, whether an image captured by the one or more cameras includes a representation of the vehicle, based on determining that an image captured by the one or more cameras does not include a representation of the vehicle, determining, by the monitoring system, whether an image captured by the one or more cameras should include a representation of the vehicle, and based on determining, by the monitoring system, that an image captured by the one or more cameras should include a representation of the vehicle, performing, by the monitoring system, one or more operations to instigate movement of the vehicle to a different location that is (i) within a field of view of the one or more cameras and (ii) where an image captured by the one or more cameras includes a representation of the vehicle.

In some implementations, the operations may further include obtaining additional data from one or more monitoring system components, determining, based on the additional data, whether the vehicle is parked within a field of view of one or more cameras, and based on determining, by the monitoring system and based on the additional data, that the vehicle is parked within a field of view of the one or more cameras: determining, by the monitoring system and based on the additional data, whether an image captured by the one or more cameras includes a representation of the vehicle, based on determining that an image captured by the one or more cameras does not include a representation of the vehicle, determining, by the monitoring system, whether an image captured by the one or more cameras should include a representation of the vehicle, and based on determining, by the monitoring system, that an image captured by the one or more cameras should not include a representation of the vehicle, determining, by the monitoring system, to not use the one or more cameras to monitor the parked vehicle.

In some implementations, operations may further include obtaining, by the monitoring system and from the vehicle, data indicating that the vehicle has parked.

In some implementations, the operations may further include obtaining, by the monitoring system and from a monitoring system component, data indicating that the vehicle has parked.

In some implementations, determining, by the monitoring system, whether the vehicle is parked within a predetermined distance of a property may include determining, by the monitoring system, based on location information received from the vehicle, whether the vehicle is within a predetermined distance of the property.

In some implementations, obtaining data from one or more monitoring system components may include obtaining, by the monitoring system, image data that is based on images captured by the one or more cameras installed at the property.

In some implementations, determining, based on the obtained data, whether the vehicle is parked within a field of view of the one or more cameras may include determining, by the monitoring system, whether a location of the vehicle falls within a respective range of locations that define respective viewing angles of the one or more cameras.

In some implementations, performing, by the monitoring system, one or more operations to instigate movement of the vehicle to a different location that is (i) within a field of view of the one or more cameras and (ii) where an image captured by the one or more cameras includes a representation of the vehicle may include transmitting, by the monitoring system and to a user device, an alert that notifies an occupant of the vehicle that the vehicle is parked in a location that cannot be monitored by the one or more cameras.

In some implementations, performing, by the monitoring system, one or more operations to instigate movement of the vehicle to a different location that is (i) within a field of view of the one or more cameras and (ii) where an image captured by the one or more cameras includes a representation of the vehicle may include transmitting, by the monitoring system and to the vehicle, an alert that notifies (i) the vehicle or (ii) an occupant of the vehicle that the vehicle is parked in a location that cannot be monitored by the one or more cameras.

DETAILED DESCRIPTION

Figure 1:
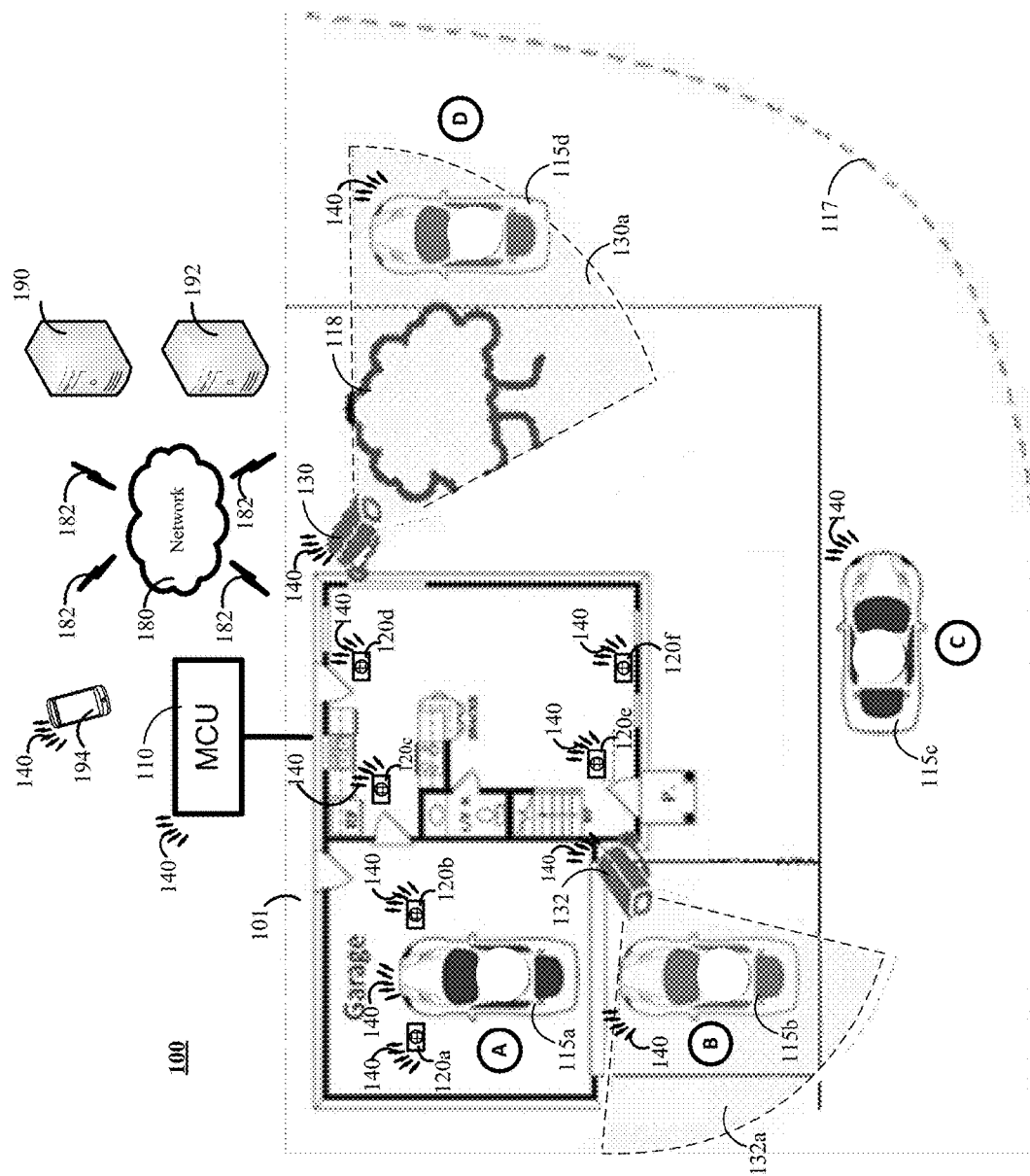
FIG. 1 is a contextual diagram of an example of a monitoring system for monitoring a parked vehicle.

The present disclosure is directed towards a monitoring system that can be used to park a vehicle in a camera's line of sight. In some implementations, the monitoring system may monitor the parking of a vehicle by a human operator. For example, the monitoring system can determine whether a human operator parked the vehicle within a predetermined distance of a property. In response to determining that the human operator parked the vehicle within a predetermined distance of the property, the monitoring system can determine whether the human operator parked the vehicle in a location where the vehicle can be monitored by the monitoring system. A vehicle is in a location that can be monitored by the monitoring system if the vehicle is parked in a location that is (i) within a camera's line of sight and (ii) visible to the camera. In response to determining that the human operator parked the vehicle in a location that cannot be monitored by the monitoring system, the monitoring system can determine whether the vehicle should be monitored using one or more cameras of the monitoring system. In response to determining that the vehicle should be monitored by one or more cameras of the monitoring system, the monitoring system can notify a human operator of the vehicle to alert the human operator that the vehicle cannot be monitored by the monitoring system in the location where the human operator parked the vehicle. The human operator can then chose to move the vehicle to a different location where the vehicle can be monitored by the monitoring system or to assume the risk of leaving the vehicle parked in its current location where the vehicle cannot be monitored by the monitoring system.

In some implementations, the monitoring system control unit may monitor the parking of a semi-autonomous or fully autonomous vehicle. A semi-autonomous vehicle may include a vehicle that is capable of autonomously performing one or more operations such as autonomous parking while separately relying on a human operator to perform one or more other operations such as driving on a highway. A fully autonomous vehicle may include a vehicle that can perform the full range of significant vehicle operations without relying on a human operator to operate the vehicle. For example, a fully autonomous vehicle may be capable of performing significant vehicle operations such as parking, driving on local streets, driving on highways, and the like without relying on a human operator. However, an autonomous vehicle (or semi-autonomous vehicle) may rely on a human operator to perform less significant operations such as starting the autonomous vehicle, providing a destination address to the autonomous vehicle, or the like. For the remainder of this specification, semi-autonomous and fully autonomous vehicles may be referred to as "autonomous vehicles" because both semi-autonomous and fully autonomous vehicles are described as vehicles that are capable of parking without relying on input from a human operator.

The monitoring system may monitor the parking of an autonomous vehicle. For example, the monitoring system can determine whether an autonomous vehicle parked within a predetermined distance of a property. In response to determining that the autonomous vehicle parked within a predetermined distance of the property, the monitoring system can determine whether the autonomous vehicle parked in a location that can be monitored by the monitoring system. An autonomous vehicle is in a location that can be monitored by the monitoring system if the autonomous vehicle is parked in a location that is (i) within a camera's line of sight and (ii) visible to the camera. In response to determining that the autonomous vehicle parked in a location that cannot be monitored by the monitoring system, the monitoring system can determine whether the autonomous vehicle should be monitored by one or more cameras of the monitoring system. In response to determining that the autonomous vehicle should be monitored by one or more cameras of the monitoring system, the monitoring system can transmit one or more instructions to the autonomous vehicle that instruct the autonomous vehicle to move to a different location that can be monitored by the monitoring system. The autonomous vehicle can receive the one or more instructions and move to a different location that can be monitored by the monitoring system based on the one or more received instructions.

Alternatively, or in addition, the monitoring system may notify a human user that is the owner, renter, or other form of authorized user of the autonomous vehicle that the autonomous vehicle parked in a location that cannot be monitored by the monitoring system. In such instances, the human user can be prompted with the option to (i) assume the risk of letting the autonomous vehicle park in a location that cannot be monitored by the monitoring system or (ii) instruct the autonomous vehicle to move to a location that can be monitored by the monitoring system.

FIG. 1 is a contextual diagram of an example of a monitoring system 100 for monitoring a parked vehicle 115a, 115b, 115c, 115d.

The monitoring system 100 may include a monitoring system control unit 110, a vehicle 115a, 115b, 115c, 115d, one or more sensors 120a, 120b, 120c, 120d, 120e, 120f, one or more cameras 130, 132, a local network 140, a remote network 180, one or more communication links 182, a monitoring application server 190, a user device 194, or a combination thereof.

The monitoring system control unit 110 (or monitoring application server 190) is configured to detect when a vehicle such as a vehicle 115a, 115b, 115c, 115d parks. For example, the vehicle 115a, 115b, 115c, 115d may broadcast a data via one or more networks such as a local network 140, a remote network 180, or both, that indicates that (i) the vehicle 115a, 115b, 115c, 115d has parked and (ii) the location of the vehicle 115a, 115b, 115c, 115d. The monitoring system control unit 110 (or monitoring application server 190) can determine, based on the location of the vehicle 115a, 115b, 115c, 115d, whether the monitoring system control unit 110 (or monitoring application server 190) should evaluate whether the vehicle 115a, 115b, 115c, 115d parked in a location that can be monitored by the monitoring system 100. The location may include GPS location.

For example, the monitoring system control unit 110 (or monitoring application server 190) can determine, whether the vehicle 115a, 115b, 115c, 115d is within a predetermined distance 117 of the property 101. If the vehicle 115a, 115b, 115c, 115d is not within a predetermined distance 117 of the property 101 when the vehicle 115a, 115b, 115c, 115d parks, then the monitoring system control unit 110 (or monitoring application server 190) may not evaluate whether the vehicle 115a, 115b, 115c, 115d is parked in a location that can be monitored by the monitoring system 100. Alternatively, if the vehicle 115a, 115b, 115c, 115d is within a predetermined distance 117 of the property 101 when the vehicle 115a, 115b, 115c, 115d parks, then the monitoring system control unit 110 (or monitoring application server 190) may evaluate whether the vehicle 115a, 115b, 115c, 115d is in a location where the vehicle 115a, 115b, 115c, 115d can be monitored by the monitoring system.

The monitoring system control unit 110 (or monitoring application server 190) can evaluate whether the vehicle 115a, 115b, 115c, 115d is in a location where the vehicle can be monitored based on monitoring system data obtained from one or more monitoring system components. For example, the monitoring system control unit 110 (or monitoring application server 190) can obtain image data from one or more cameras 130, 132, sensor data from one or more sensors 120a, 120b, 120c, 120d, 120e, 120f, or both. The monitoring system control unit 110 (or monitoring application server 190) can evaluate the obtained monitoring system data to determine whether the vehicle 115a, 115b, 115c, 115d is in a location where the vehicle 115a, 115b, 115c, 115d can be monitored by the monitoring system 100. The vehicle 115a, 115b, 115c, 115d is in a location where the vehicle 115a, 115b, 115c, 115d can be monitored if (i) the vehicle 115a, 115b, 115c, 115d is parked within the line of sight of one or more cameras 130, 132 and (ii) the vehicle 115a, 115b, 115c, 115d is visible to one or more cameras 130, 132 of the monitoring system 100. A vehicle is parked within a line of sight of the one or more cameras if the vehicle is parked within the camera's field of view. A vehicle 115a, 115b, 115c, 115d is visible to a camera 130, 132 if the camera can capture image data that includes a representation of (e.g., depicts) the vehicle 115a, 115b, 115c, 115d.

If the monitoring system control unit 110 (or monitoring application server 190) determines that vehicle 115a, 115b, 115c, 115d is parked in a location that (i) is in the line of sight of one or more cameras 130, 132 and (ii) is visible to one or more cameras 130, 132, then the monitoring system control unit 110 (or monitoring application server 190) may determine that the vehicle 115a, 115b, 115c, 115d is parked in a location that can be monitored by the monitoring system 100. In such instances, the monitoring system control unit 110 (or monitoring application server 190) may not take further action that is related to prompting the vehicle 115a, 115b, 115c, 115d to move.

Instead, in such instances when the vehicle 115a, 115b, 115c, 115d is determined to be parked in a location that can be monitored, the monitoring system control unit 110 (or monitoring application server 190) can monitor the vehicle 115a, 115b, 115c, 115d by, for example, obtaining image data depicting the vehicle 115a, 115b, 115c, 115d using the one or more cameras 130, 132, storing the obtained image data, analyzing the obtained image data for the presence of unexpected objects (e.g., unauthorized individuals), or the like. If the monitoring system control unit 110 (or monitoring application server 190) detects, based on an analysis of the obtained image data, the presence of an object such as an unauthorized individual making contact with the vehicle 115a, 115b, 115c, 115d, attempting to enter the vehicle 115a, 115b, 115c, 115d, or the like, then the monitoring system control unit 110 (or monitoring application server 190) can notify a central alarm station server 192. The central alarm station server 192 may transmit a request to one or more law enforcement agencies that asks for the one or more law enforcement agencies to dispatch one or more law enforcement agents to the property 101.

Alternatively, if the monitoring system control unit 110 (or monitoring application server 190) determines that vehicle 115a, 115b, 115c, 115d is parked in a location that (i) is not in the line of sight of one or more cameras 130, 132 or (ii) is not visible to one or more cameras 130, 132, then the monitoring system control unit 110 (or monitoring application server 190) may determine whether the vehicle 115a, 115b, 115c, 115d ought to be monitored by one or more cameras of the monitoring system 100.

If the vehicle 115a, 115b, 115c, 115d is not parked in a location where the vehicle 115a, 115b, 115c, 115d can be monitored and the monitoring system control unit 110 (or monitoring application server 190) determines that the vehicle 115a, 115b, 115c, 115d need not be monitored by the monitoring system 100, then the monitoring system control unit 110 (or monitoring application server 190) may take no further action with respect to prompting the vehicle 115a, 115b, 115c, 115d (or its legitimate owner, operator, or occupant) to move the vehicle within view of a camera. For example, a vehicle 110 may need not be monitored by one or more cameras 130, 132 of the monitoring system 100 if the vehicle 115a, 115b, 115c, 115d is parked in the garage of the property 101. The monitoring system control unit 110 (or monitoring application server 190) may determine that vehicle 115a, 115b, 115c, 115d is parked inside the garage based on sensor data from one or more motion sensors 120a, 120b, a location of the vehicle (e.g., GPS location), or both.

If the vehicle 115a, 115b, 115c, 115d ought to be monitored (e.g., because the vehicle is within a predetermined distance 117 of the property 101 and not parked inside a garage) and the monitoring system control unit 110 (or monitoring application server 190) determines that the vehicle 115a, 115b, 115c, 115d is parked in a location that cannot be monitored by the monitoring system 100, then the monitoring system control unit 110 (or monitoring application server 190) may perform one or more operations.

Regardless of the type of vehicle (e.g., human operated vehicle or autonomous vehicle), the one or more operations may include generating and transmitting a notification that alerts a legitimate owner, operator, or occupant of the vehicle 115a, 115b, 115c, 115d that the vehicle 115a, 115b, 115c, 115d is parked in a location that cannot be monitored by the monitoring system 100. For example, the monitoring system control unit 110 (or monitoring application server 190) can generate and transmit a notification to a user device 194 such as a smartphone, a smartwatch, smart glasses, a tablet, or the like that notifies the legitimate occupant, operator, or owner of the vehicle 115a, 115b, 115c, 115d that the vehicle 115a, 115b, 115c, 115d is not parked in a location that can be monitored by the monitoring system 100. Alternatively, the notification may be transmitted to the vehicle 115a, 115b, 115c, 115d and provided for display on an information panel of the vehicle 115a, 115b, 115c, 115d, a heads-up display of the vehicle 115a, 115b, 115c, 115d, or the like. In some implementations, the notification may include a parking suggestion. For example, the notification may include data that suggests that the driver pull the vehicle forward or backward a particular distance in order to move vehicle into a position that can be monitored by the monitoring system. In other implementations, the notification may include an aerial view of the property that highlights portions of the property (or portions of a surrounding vicinity of the property) where the vehicle can be parked and be monitored.

If the vehicle 115a, 115b, 115c, 115d is an autonomous vehicle, the monitoring system control unit 110 (or monitoring application server) can transmit one or more instructions to the vehicle 115a, 115b, 115c, 115d that instruct the vehicle 115a, 115b, 115c, 115d to drive to a location that can be monitored by the monitoring system 100. For example, the monitoring system control unit 110 (or monitoring application server) may provide GPS coordinates (or other location information) of a zone such as zone 132a where the vehicle 115a, 115b, 115c, 115d can be monitored by the monitoring system 100. An autonomous vehicle can receive the notification from the monitoring system control unit 110 and drive the location identified by the received notification. The monitoring system 100 can then begin monitoring the property.

In some implementations, a monitoring system control unit 110 (or monitoring application server 190) can perform operations to validate the identity of a vehicle that is parked within a line of sight of a camera and visible to the camera. For example, the monitoring system control unit 110 (or monitoring application server 190) may transmit one or more instructions to a vehicle in the line of sight of a camera and visible to the camera that instruct the vehicle to perform an action such as flashing the vehicle's headlights or beeping the vehicle's horn. The monitoring system control unit 110 (or monitoring application server 190) may determine that the vehicle's identity is validated if the monitoring system control unit 110 (or monitoring application server 190) detect image data that includes a representation of the responsive vehicle action (e.g., image or video of blinking of lights) or audio data that includes a representation of the responsive vehicle action (e.g., audio of horn beeping). Alternatively, if no responsive action (e.g., blinking of lights or honking of horn) is detected by the vehicle, then the identity of the vehicle as not being associated with the property. In some implementations, the monitoring system control unit 110 (or monitoring application server 190) may perform one or more operations in response to detecting an unvalidated vehicle. For example, the monitoring system control unit 110 (or monitoring application server 190) may transmit a notification to a user device of a property resident that alerts the property resident to of the unvalidated vehicle. In some implementations, the notification may include an image or video of the vehicle, a link to a live feed of the video, or other identifying information of the vehicle. In other implementations, the monitoring system control unit 110 (or monitoring application sever 190) may alert a central alarm station server 192 or law enforcement agency of the unvalidated vehicle. In some implementations, the responsive operations may be configurable from a user device such as a mobile application, a web portal, or the like.

Operation of the monitoring system 100 is described with reference to multiple different examples of FIG. 1.

For example, with reference to parking location A of FIG. 1, the vehicle 115a may park in the garage 101. The monitoring system control unit 110 (or monitoring application server 190) may determine based on the vehicle's 115*a* location that the vehicle parked within a predetermined distance 117 of the property 101. The monitoring system control unit 110 (or monitoring application server 190) may determine that the vehicle 115*a* is not in line of sight of a camera 130, 132 and not visible to one or more cameras 130, 132. However, the monitoring system control unit (or monitoring application server 190) may determine to not notify the vehicle 115 or a legitimate owner, operator, or occupant of the vehicle 115*a* that the vehicle 115*a* is parked in a location that cannot be monitored by monitoring system 100. This is because the monitoring system can determine that the vehicle 115*a* should not be monitored by one or more cameras 13, 132 of the monitoring system 100 because the vehicle 115*a* is in the garage. The monitoring system control unit 110 (or monitoring application server 190) may determine that he vehicle 115*a* is in the garage based on (i) sensor data generated by one or more sensors 120*a*, 120*b* (e.g., motion sensors, temperature sensors, pressure or weight sensors, audio sensors, or the like), (ii) location data of the vehicle (e.g., GPS location), or (iii) both. Because the vehicle 115*a* is parked in a location that should not be monitored by one or more cameras 130, 132, no notifications are generated and transmitted to prompt the vehicle 115*a* or a lawful owner, operator, or occupant of the vehicle 115*a* to move the vehicle 115*a* to a location that can be monitored by the monitoring system 130.

With reference to parking location B of FIG. 1, the vehicle 115*b* may be parked in driveway of property 101. The monitoring system control unit 110 (or monitoring application server 190) can determine that the vehicle 115*b* is parked within a predetermined distance 117 of the property 101 based on location information (e.g., GPS location) received from the vehicle 115*b* (or a user device of the vehicle's occupant) when the vehicle 115*b* parks and evaluate whether the vehicle 115*b* is in a location where the monitoring system 100 can monitor the vehicle 115*b* while parked. The monitoring system control unit 110 (or monitoring application server 190) can determine that the vehicle 115*b* is in the zone 132*a* that is defined by the line of sight of camera 132. The monitoring system control unit 110 (or monitoring application server 190) can analyze one or more images captured by camera 132 and determine that the one or more images depict the vehicle 115*b*. Because the one or more images captured by the camera 132 depict the vehicle 115*b*, the monitoring system control unit 110 (or monitoring application server 190) can determine that the vehicle 115*b* is visible to the camera 132. Moreover, the monitoring system control unit 110 (or monitoring application server 190) can determine, based on the vehicle's location data (or a location of the user device inside the vehicle 115 when the vehicle 115*b* parked), that the vehicle 115*b* is parked outside property 101 and should be monitored by one or more cameras 130, 132 when not in use.

In the example of FIG. 1 with the vehicle parked in parking location B, the monitoring system control unit 110 (or monitoring application server 190) may not take any further action to generate and transmit notifications to the vehicle 115*b* or a legitimate owner, operator or occupant to prompt relocation of the vehicle 115*b* so that the vehicle 115*b* can be monitored by one or more cameras. Instead, in such instances when the vehicle 115*b* is determined to be parked in a location that can be monitored, the monitoring system control unit 110 (or monitoring application server 190) can monitor the vehicle 115*b* by, for example, obtaining image data depicting the vehicle 115*b* using the camera 132, storing the obtained image data obtained from camera 132, analyzing the obtained image data obtained from camera 132 for the presence of unexpected objects (e.g., unauthorized individuals), or the like.

With reference to parking location C of FIG. 1, the vehicle 115*c* may be parked on the street in front of the property 101. The monitoring system control unit 110 (or monitoring application server 190) can determine that the vehicle 115*c* is parked within a predetermined distance 117 of the property 101 based on location information (e.g., GPS location) received from the vehicle 115*c* (or a user device of the vehicle's occupant) when the vehicle 115*c* parks and evaluate whether the vehicle 115*c* is in a location where the monitoring system 100 can monitor the vehicle 115*c* while parked. The monitoring system control unit 110 (or monitoring application server 190) can determine that the vehicle 115*c* is not within the line of sight of any camera 130, 132. The line of sight of each camera of the property 130, 132 may be learned by the monitoring system 100 based on an analysis of image data captured by each respective camera. Alternatively, the line of sight of each camera of the property 130, 132 may be determined based on a range of locations (e.g., GPS locations) that fall within viewing angles of each respective camera 130, 132.

After determining that the vehicle 115*c* is not parked within a line of sight of one or more cameras 130, 132 of the monitoring system 100, the monitoring system control unit 110 (or monitoring application server 190) can determine, based on the vehicle's 115*c* parked location whether the vehicle should be monitored by one or more cameras 130, 132. In this example, the monitoring system control unit 110 (or monitoring application server 190) can determine, based on the vehicle's 115*c* location data when parked (or a location of the user device inside the vehicle 115*c* when the vehicle 115*c* parked), that the vehicle 115*c* is parked on the street in front of the property 101 and should be monitored by one or more cameras 130, 132 when not in use.

In the example of FIG. 1 with the vehicle parked in parking location C, the monitoring system control unit 110 (or monitoring application server 190) may generate and transmit notifications to the vehicle 115*c* or a legitimate owner, operator or occupant to prompt relocation of the vehicle 115*c* so that the vehicle 115*c* can be monitored by one or more cameras. For example, for any type of vehicle (e.g., an autonomous vehicle or a vehicle that is not autonomous), the monitoring system control unit 110 (or monitoring application server 190) can transmit a notification to user device 194 for display on a user interface (or output via a speaker of the user device 194), to the vehicle 115*c* for display on an information console (output via a speaker of the vehicle 115*c*), or both. The notification may alert legitimate owner, operator, or occupant of the vehicle 115*c* that the vehicle is not parked in a location that can be monitored by one or more cameras 130, 132 and ask the legitimate owner, operator, or occupant whether the legitimate owner, operator, or occupant whether he/she wants to move the vehicle to a different parked location that can be monitored by one or more cameras 130, 132. In some implementations, the notification may include directions to, an image of, or both, a different parked location associated with the property 101 that can be monitored by the one or more cameras 130, 132. For example, the notification may communicate to the legitimate owner, operator, or occupant of the vehicle 115*c* to park in the driveway, show an image of the driveway, or both.

Alternatively, or in addition, for autonomous vehicles, the monitoring system control unit 110 (or monitoring application server 190) may transmit one or more instructions to an autonomous vehicle parked in parking location C. The autonomous vehicle may be configured to reposition itself within a camera's point of view. In such instances, for example, a vehicle 115c may move itself to the driveway inside zone 132a so that the vehicle 115c can be monitored by the camera 132. In some implementations, the vehicle 115c may autonomously move itself into the zone 132a based on analysis of a real-time data loop between the vehicle 115c and camera 132, based on a received set of coordinates associated with a parking spot at the property 101 that is monitored by one or more cameras, based on received GPS coordinates associated with the camera zone 132a, or the like.

In some implementations, a response to a notification can be transmitted to a user device 194 of a legitimate owner, operator, or occupant to notify the legitimate owner, operator, or occupant that the vehicle 115c is parked in a location that is not monitored by one or more cameras 130, 132. In such instance the legitimate owner, operator, or occupant may be provided with the opportunity to transmit data to the vehicle 115c that overrides the vehicle's 115c attempt to move itself into a different parked location.

With reference to parking location D of FIG. 1, the vehicle 115d may be parked on the street on the side of the property 101. The monitoring system control unit 110 (or monitoring application server 190) can determine that the vehicle 115d is within a predetermined distance 117 of the property 101 based on location information (e.g., GPS location) received from the vehicle 115d (or a user device of the vehicle's occupant) and evaluate whether the vehicle 115d is in a location where the monitoring system 100 can monitor the vehicle 115d while parked. The monitoring system control unit 110 (or monitoring application server 190) can determine that the vehicle 115d is in the zone 130a that is defined by the line of sight of camera 130.

However, the monitoring system control unit 110 (or monitoring application server 190) can analyze one or more images captured by camera 130 and determine that none of the one or more images depict the vehicle 115d. In this example, the even though the vehicle 115d is in the zone 130a defined by the line of sight the camera 130, the vehicle 115d is not visible to the camera 130 when the vehicle 115d is parked in location D because the tree 118 is in between the camera 130 and the vehicle 115d. Because the vehicle 115d parked in location D is not visible to one or more cameras 130, 132 of the monitoring system 100, the monitoring system control unit 110 (or monitoring application server 190) may perform one or more operations to prompt the vehicle 115d to move from location D to a location that can be monitored by one or more cameras 130, 132. The one or more operations are the same as described above with reference to prompting the vehicle 115c to move from parking location C.

The features of the present disclosure described above be used to implement one or more particular applications. For example, the monitoring system 100 could be configured to associate specific parking locations with specific vehicles. For example, a user may use user device that can communicate with the monitoring system control unit 110, the monitoring application server, or both, to input data that creates an associate between a particular parking location for a particular vehicle. For example, a legitimate occupant of the property 101 may user a user device to provide data to the monitoring system control unit 110, the monitoring application server 190, or both that associates the legitimate occupant's BMW with the particular parking spot of the garage of property 101 and never on the street.

In such instances, If the monitoring system 100 detects that the legitimate occupant's BMW is parked on the street the BMW, a user device of legitimate occupant (or other owner, operator, or occupant of the BMW, could be instructed to reposition the BMW. For example, if the BMW is autonomous, the monitoring system control unit 110, the monitoring application server 190, or both, may instruct the BMW to re-park in the garage. Alternatively, if the BMW is not autonomous, then an owner, operator, or occupant of BMW can be notified that the BMW should be moved to the garage. Such instructions, notifications, or both may be transmitted even if the BMW is parked within line of sight and visible to one or more cameras because the user has instructed the monitoring system control unit 110, the monitoring application server 190, or both, to create a rule that the BMW must park in the garage. Other types of rules may also be created for one or more other vehicles. For, example, the user may create a rule that a particular vehicle must be parked on the street. In some instances, such a rule may require the monitoring system control unit 110, the monitoring application server 190, or both, to notify one or more other vehicles or owners, operators, or occupants of the one or more other vehicles to instruct or notify the vehicle or owner, operators, or occupant, respectively, that the one or more other vehicles need to be moved to satisfy the established parking rule.

In some implementations, the monitoring system may be configured to determine that an object that is being hauled by a vehicle is an extension of the vehicle, and therefor must be located within a line of sight of a camera while parked. For example, a vehicle may haul a boat, a trailer, or the like. In such instances, the vehicle hauling the boat, the trailer, or the like may be instructed to move if the car is autonomous or the owner, operator, or occupant may be notified that the vehicle should be moved. In each case, the monitoring system may determine that the vehicle should be moved until the object being hauled is also within a line of sight of a camera and visible to the camera so that the vehicle and object being hauled can be monitored by the monitoring system 100 while parked. of one or more cameras if the vehicle is fully visible to a camera, the trailer may not be. In some implementations, the monitoring system control unit 110, the monitoring application server 190, or both, may transmit a suggestion to the vehicle, the owner, operator, occupant, or a combination thereof, that indicates a particular spot that is big enough to park the vehicle and object being hauled so that both can be within a line of sight of one or more cameras and monitored by the monitoring system while parked.

In some implementations, the monitoring system control unit is configured to notify a vehicle, a vehicle owner, a vehicle operator, a vehicle occupant, or a combination thereof, that has entered a location that is within a predetermined distance of a property 101 that no valid spots are available. A valid spot may include, for example, a spot where a vehicle can park and be monitoring by one or more cameras of a property 101. In such instances, a cloud-based monitoring system control unit 190 may notify the vehicle, vehicle owner, vehicle operator, vehicle occupant, or a combination thereof, of the next closet valid parking spot that exists with respect to the property 101. The next closet valid parking spot may be on the street in front of a neighbor's house, in a parking lot of a nearby business, or the like.

In this example, the cameras 130, 132 were stationary cameras installed on a portion of the property 101. However, the present disclosure need not be so limited. Instead, or in addition, other types of cameras may be used. For example, drone mounted cameras may be used to navigate throughout the area surrounding the property 101 and the camera feed from the drone mounted camera can be used to monitor a parked vehicle. In some implementations, the monitoring system control unit 110, the monitoring application server 190, or other computing device may instruct a drone to deploy in response to a determination that one or more portions of a vehicle cannot be monitored by a stationary camera. For example, a drone may be deployed by the monitoring system control unit 110, the monitoring application server 190, or the like in response to determination that there are no valid parking locations at a property. In such instances, the drone can navigate to a particular location, and use its drone-mounted camera to monitoring a previously-unmonitored parking space in order to create a new and valid parking spot that can be monitored using the drone's camera feed. The drone can communicate with other components of the monitoring system 100 using the networks 140, the networks 180, or both.

In some implementations, the image data obtained and analyzed by the monitoring system control unit 110 (or monitoring application server 190) may include images or video generated by one or more of the respective cameras 130, 132. However, the present disclosure need not be so limited. In other implementations, the image data may include data representing a determination made by one or more of the respective cameras 130, 132 based on the respective camera's analysis of a generated image or video. For example, one or more of the cameras 130, 132 may store an image model that represents objects that can be detected by the camera such as one or more types of vehicles, particular authorized vehicles specific to occupants of the property (e.g., the vehicles the occupants own, lease, etc.), particular authorized vehicles of acquaintances of occupants of the property that are also authorized to park within a vicinity of the property, or the like. The image model may include, for example, a set of features describing an image (or video) of an object, a machine learning model that has been trained to detect objects in an image (or video), or even one or more stored images (or videos) of objects. By way of example, a camera such as camera 130 may store an image model representing a vehicle. The camera 132 may generate an image (or video), obtain a set of features (e.g., isolated sets of pixels representing points of an image, curves of an image, continuous regions of an image, or the like), and determine a level of similarity between the obtained set of features and the stored model. If the camera 132 determines that a similarity level between the obtained set of features and the stored image model representing a vehicle satisfies a predetermined threshold, the camera 132 may determine that the vehicle is visible. In some implementations, the camera 132 may store a model that was downloaded to (or uploaded to) the camera 132 of particular vehicles authorized to park at the property. The camera 132 can then broadcast image data representing a determination, by the camera 132, that indicates that the camera 132 detected the vehicle. This image data representing a determination of the camera 132 can be provided to the monitoring system control unit 110 (or monitoring application server 190) and the monitoring system control unit 110 (or monitoring application server 190) can process the received image data to determine whether an image captured by the camera 132 depicts a vehicle. If the monitoring system control unit 110 (or monitoring application server 190) determines that the image data indicates that an image (or video) captured by the camera 132 depicts the vehicle, the monitoring system control unit 110 (or monitoring application server 190) can determine that the vehicle is in line of sight of the camera 132 and visible to the camera 132.

Figure 2:
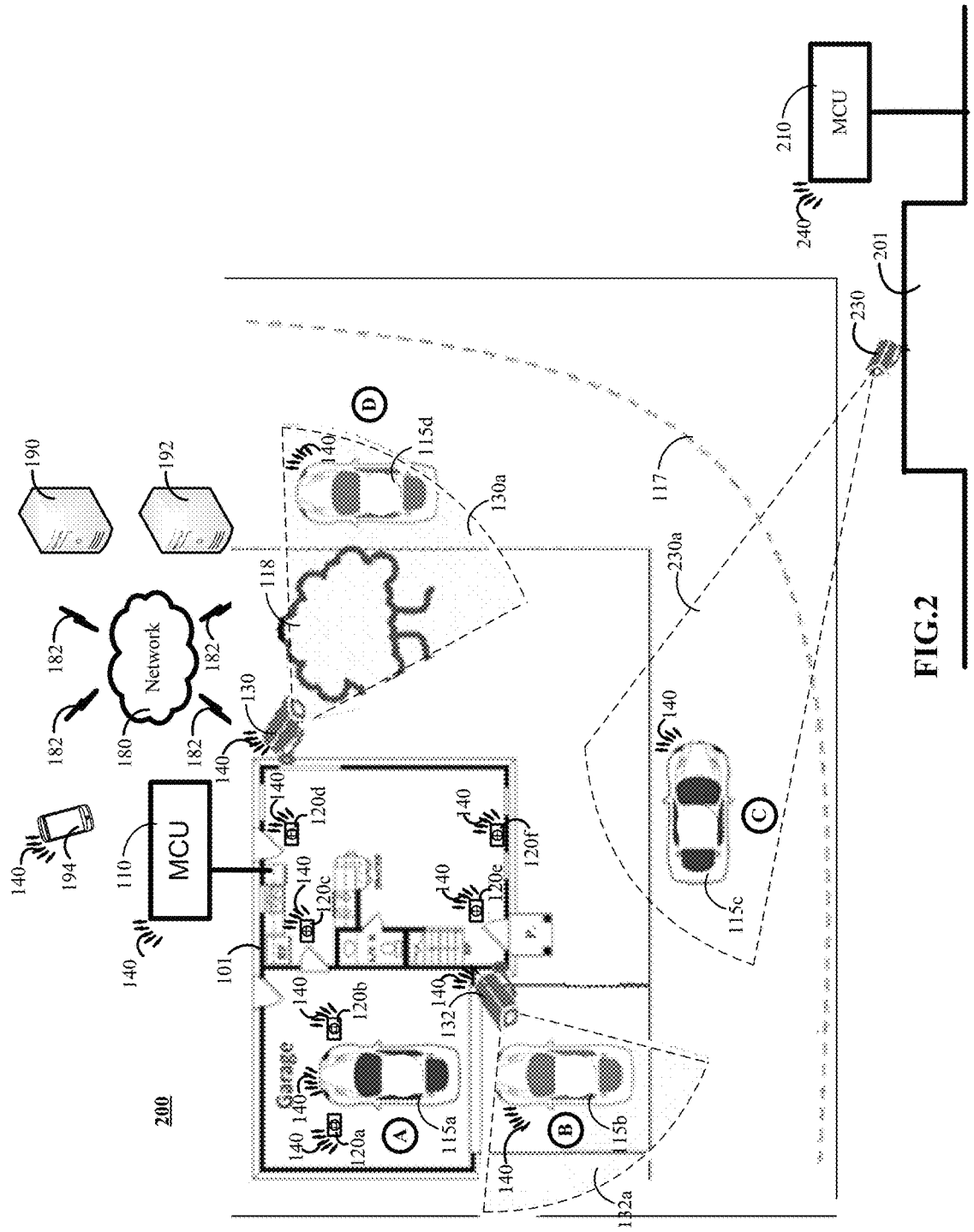
FIG. 2 is a contextual diagram of another example of a monitoring system for monitoring a parked vehicle.

FIG. 2 is a contextual diagram of another example of a monitoring system 200 for monitoring a parked vehicle 115a, 115b, 115c, 115d.

The monitoring system 200 includes the same features described above with reference to the monitoring system 100. In addition, the monitoring system 200 can use the monitoring application server 190 to aggregate image data from cameras of multiple properties 101, 201 to monitor parked vehicles.

FIG. 2 continues the series of examples with a vehicle 115a, 115b, 115c, 115d parked in respective locations A, B, C, and D. In FIG. 2, the monitoring system 200 will perform the same operations with respect to a vehicle 115a, 115b, 115d parked in respective locations A, B, and D. However, the monitoring system 200 can determine that the vehicle 115c parked at location C is parked in a location that is monitored by one or more cameras 130, 132, the 230 because the vehicle 115c is parked in a location that is within the camera's 230 line of sight and visible by camera 230. As a result, the monitoring system 200 can use the image data from camera 230 that is installed at a different property 201 to monitor the vehicle 115c parked in location C in front of property 101.

The property 201 may include a monitoring system control unit 210, one or more cameras 230, and a local network 240. In some implementations, the property 200 may also include one or more sensors or detectors that can be used to sense attributes of the property 201. The monitoring system control unit 210 (or monitoring application server 190) can detect monitoring system data such as sensor data generated by the one or more sensors or detectors installed at property 201 or image data generated by camera 230 and determine whether the monitoring system data is indicative of a potential event.

The monitoring application server 190 can obtain monitoring system data form multiple different properties 101, 201. The monitoring application server 190 can include one or more cloud-based servers that are configured to monitor aspects of one or more properties based on monitoring system data (e.g., sensor data, image data, monitoring system control unit notifications, or the like) from one or more monitoring system control units 110, 210 (or other monitoring system components. The monitoring application server 190 can analyze the monitoring system data from the multiple different properties, as a whole, as if the monitoring system data from each of the multiple different properties 101, 201 were produced by the monitoring system components of the same property. For example, a legitimate occupant of property 101 can park his/her vehicle 115c in front of the property 101 but the monitoring application server 190 can determine whether the vehicle 115c is parked in location that a camera of either property 101 or 201 can monitor the vehicle 115c. Likewise, the monitoring application server 190 can determine a vehicle of a legitimate occupant of a property 201 parked in front of property 201 can determine whether a camera of either property 101 or 201 can monitoring the vehicle parked in front of property 201.

By way of example, with reference to parking location C of FIG. 2, the vehicle 115c may be parked on the street in front of property 101. The monitoring application server 190 can determine that the vehicle 115c is parked within a predetermined distance 117 of the property 101 based on location information (e.g., GPS location) received from the vehicle 115c (or a user device of the vehicle's occupant) when the vehicle 115c parks and evaluate whether the vehicle 115c is in a location where the monitoring system 200 can monitor the vehicle 115c while parked. The monitoring application server 190 can determine that the vehicle 115c is in the zone 230a that is defined by the line of sight of camera 230. The monitoring application server 190 can analyze one or more images captured by camera 230 and determine that the one or more images depict the vehicle 115c. Because the one or more images captured by the camera 230 depict the vehicle 115c, the monitoring application server 190 can determine that the vehicle 115c is visible to the camera 230.

In the example of FIG. 2 with the vehicle parked in parking location C, the monitoring application server 190 may not take any further action to generate and transmit notifications to the vehicle 115c or a legitimate owner, operator or occupant to prompt relocation of the vehicle 115c so that the vehicle 115c can be monitored by one or more cameras. Instead, in such instances when the vehicle 115c is determined to be parked in a location that can be monitored, the monitoring application server 190 can monitor the vehicle 115c by, for example, obtaining image data depicting the vehicle 115c using the camera 230, storing the obtained image data from camera 230, analyzing the obtained image data obtained from camera 230 for the presence of unexpected objects (e.g., unauthorized individuals), or the like.

Figure 3:
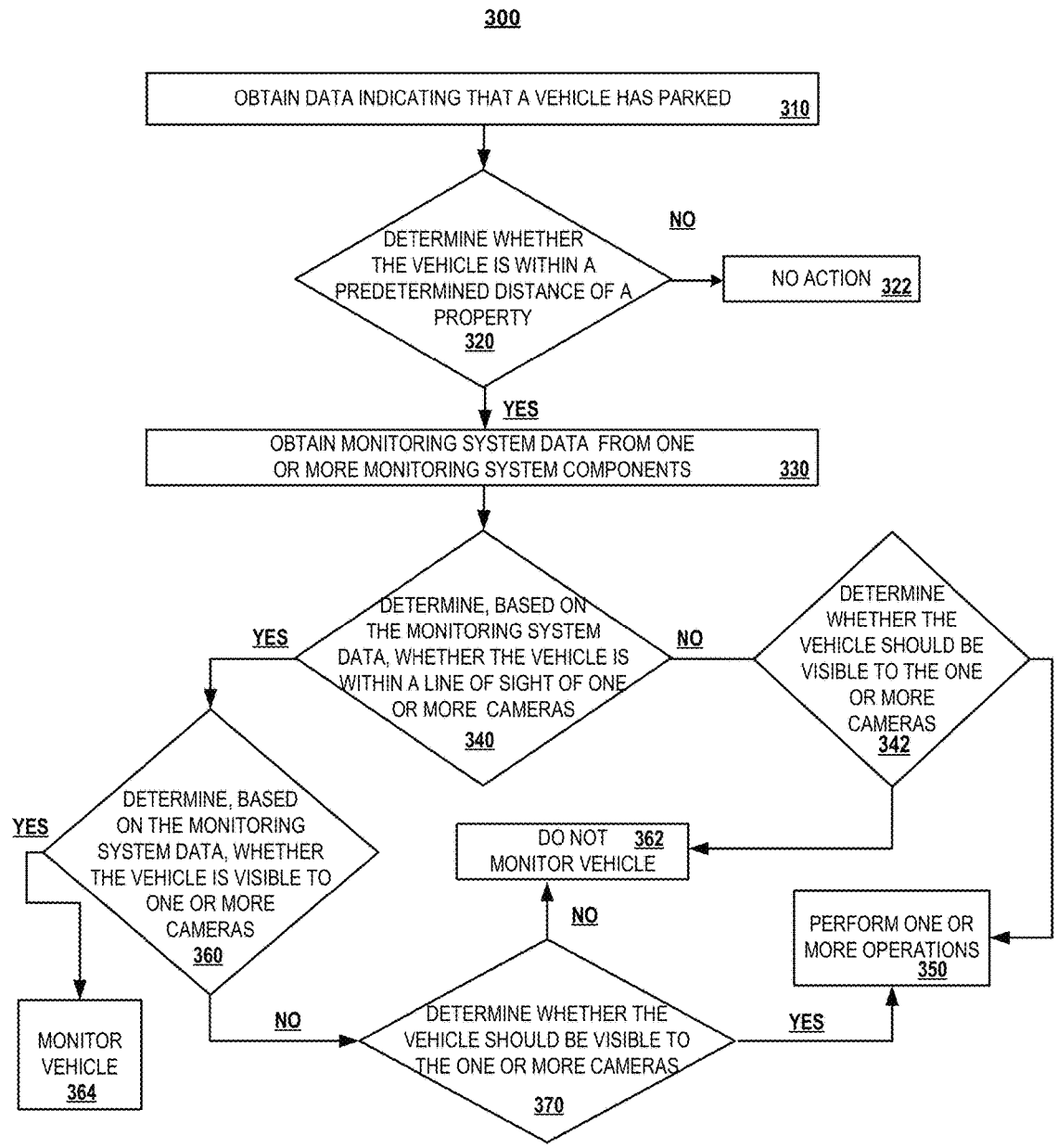
FIG. 3 is a flowchart of an example of a process for monitoring a parked vehicle.

FIG. 3 is a flowchart of an example of a process 300 for monitoring a parked vehicle. Generally, the process 300 includes obtaining data indicating that vehicle has parked (310), and determining whether the vehicle is within a predetermined distance of a property (320). In response to determining that the vehicle is not within a predetermined distance of the property, then the process 300 may terminate at stage 322 by not performing any additional stages delineated by process 300. Alternatively, in response to determining that the vehicle is within a predetermined distance of the property, then the process may continue by obtaining monitoring system data from one or more monitoring system components (330) and determining, based on the obtained monitoring system data, whether the vehicle is within a line of sight of one or more cameras (340). In response to determining, based on the obtained monitoring system data, that the vehicle is not within a line of sight of one or more cameras, then process 300 may continue by determining whether the vehicle should be visible to one or more cameras (342). In response to determining that the vehicle should not be visible to one or more cameras, the process may determine to not use one or more cameras of the monitoring system to monitor the vehicle. Such a determination may terminate the process 300 at stage 362 by not performing any additional stages delineated by the process 300. Alternatively, in response to determining that the vehicle should (or ought to) be visible to one or more cameras, the process 300 may continue at stage 350 by performing one or more operations to instigate the vehicle to move to a different location that is monitored by one or more video cameras (350). Alternatively, in response to determining, based on the obtained monitoring system data, that the vehicle is within a line of sight of one or more cameras (340), then the process 300 may continue by determining, based on the monitoring system data, whether the vehicle is visible to one or more cameras (360). In response to determining, based on the monitoring system data, that the vehicle is visible to one or more cameras, then the process 300 may continue at stage 364 by using one or more cameras of the monitoring system to monitor the parked vehicle. Alternatively, in response to determining, based on the monitoring system data, that the vehicle is not visible to one or more cameras, the process 300 may continue by determining whether the vehicle should (or ought to) be visible to one or more cameras (370). In response to determining that the vehicle should not be visible to one or more cameras, the process determine to not use one or more cameras of the monitoring system to monitor the vehicle 362. Such a determination may terminate the process 300 at stage 362 by not performing any additional stages delineated by the process 300. Alternatively, in response to determining that the vehicle should (or ought to) be visible to one or more cameras, the process may continue at stage 350 by performing one or more operations to instigate the vehicle to move to a different location that is monitored by one or more video cameras (350). For convenience, the process 300 will be described below as being performed by a monitoring unit as a monitoring system control unit or a monitoring application server, as described with reference to FIGS. 1 and 2.

In more detail, a monitoring unit can begin performance of the process 300 by obtaining 310 data indicating that vehicle has parked. For example, in some implementations, the vehicle may be configured to broadcast data indicating that he vehicle has parked, the location where the vehicle parked, or both, in response to the vehicle shifting into park, the ignition being turned off, or the like. Alternatively, an application on a user device of may detect that a vehicle has been shifted into park, and broadcast data indicating that the vehicle has parked, the location wherein the vehicle parked, or both. The broadcasted data can be detected by the monitoring unit.

The monitoring unit can determine 320 whether the vehicle is within a predetermined distance of a property. For example, the monitoring unit can determine whether the vehicle is less than a threshold distance from the property when the vehicle parks. If the vehicle is less than a threshold distance from the property, then the vehicle is within a predetermined distance of the property. Alternatively, if the vehicle is less than a threshold distance from the property, then the vehicle is not within a predetermined distance of the property.

In response to the monitoring unit determining that the vehicle is not within a predetermined distance of the property, then the monitoring unit may cease execution of the process 300 at stage 322 by not performing any additional stages delineated by process 300. In other implementations, however, the process 300 may not terminate at this point, but instead, continue to monitor for the receipt of data indicating that a vehicle has parked.

Alternatively, in response to the monitoring unit determining that the vehicle is within a predetermined distance of the property, then the monitoring unit can obtain 330 monitoring system data from one or more monitoring system components. For example, the monitoring unit may obtain image data from one or more cameras, sensor data from one or more sensors, or both. In some implementations, the cameras, the sensors, or both, may be installed at the property. Alternatively, in other implementations, one or more cameras from which image data is obtained may be installed at multiple different properties, one or more sensors from which sensor data is obtained may be installed at multiple different properties, or both. In some implementations, the one or more properties where the cameras and sensors are installed may include residential properties, commercial properties, industrial properties, or a combination thereof. In some implementations, the location where the one or more cameras, one or more sensors, or both may not include any residential properties.

The monitoring unit can determine 340, based on the obtained monitoring system data, whether the vehicle is within a line of sight of one or more cameras. For example, the monitoring unit can determine whether the location of the vehicle falls within a range of locations that define viewing angles of one or more respective cameras. If the location of the vehicle falls within the range of locations that define the viewing angles of the one or more respective cameras, then the vehicle may be determined to fall within the line of sight of one or more cameras. Alternatively, if the location of the vehicle does not fall within the range of locations defining the viewing angles of the one or more respective cameras, then the vehicle may be determined to not fall within the line of sight of the camera. The location of the vehicle and range of locations that fall within the viewing angles may include, for example, GPS locations.

In response to the monitoring unit determining, based on the obtained monitoring system data, that the vehicle is not within a line of sight of one or more cameras, then process may continue by determining whether the vehicle should be visible to one or more cameras (342). In response to the monitoring unit determining that the vehicle should not be visible to one or more cameras, the monitoring unit may determine to not use one or more cameras of the monitoring system to monitor the vehicle. Such a determination may cease performance of the process 200 at stage 362 and not perform any remaining stage of process 300. Alternatively, in response to determining that the vehicle should (or ought to) be visible to one or more cameras, the process may continue at stage 350 by performing one or more operations to instigate the vehicle to move to a different location that is monitored by one or more video cameras (350), as described in more detail below with reference to stage 350.

Alternatively, in response to the monitoring unit determining, based on the obtained monitoring system data, that the vehicle is within a line of sight of one or more cameras, then the monitoring unit can determine 360, based on the monitoring system data, whether the vehicle is visible to one or more cameras. For example, the monitoring unit can analyze images captured by one or more cameras and determine that a vehicle is visible to the one or more cameras if the monitoring unit detects an image that depicts the vehicle. In some implementations, these images may be the same images obtained at stage 330. Alternatively, in other implementations, these images may be additional images that are captured by the monitoring system using one or more cameras subsequent to those obtained at stage 330. If the monitoring system does not detect an image that depicts the vehicle, the monitoring unit may determine that the vehicle is not visible to one or more cameras.

In response to the monitoring unit determining, based on the monitoring system data, that the vehicle is visible to one or more cameras, then the monitoring unit use one or more cameras to monitor the vehicle at stage 364.

Alternatively, in response to the monitoring unit determining, based on the monitoring system data, that the vehicle is not visible to one or more cameras, the monitoring unit may determine 370 whether the vehicle should be visible to one or more cameras. For example, the monitoring unit may determine that the vehicle should be visible to the one or more cameras based on whether the vehicle is parked outside the property (e.g., on a street, driveway, or the like) or inside the property (e.g., in a garage). The monitoring unit may determine that he vehicle is inside or outside the property based on location information (e.g., GPS location) that is associated with the vehicle.

In response to the monitoring unit determining that the vehicle should not be visible to one or more cameras, then the monitoring unit may determine to not use one or more cameras to monitor the vehicle at stage 362. Such a determination may cease execution of the process 300 at stage 362 by not performing any additional stages delineated by process 300. For example, the monitoring unit may determine that the vehicle should not be visible to the one or more cameras if the vehicle's location information, sensor data, or both, indicate that the vehicle is parked inside a portion of the property such as a garage.

Alternatively, in response to the monitoring unit determining that the vehicle should be visible to one or more cameras, then the monitoring unit may perform 350 one or more operations to instigate the vehicle to move to a different location that is monitored by one or more video cameras. In some implementations, a monitoring system may determine that a vehicle should be visible if the vehicle is parked on a street outside a property. The operations may include the monitoring unit generating and transmitting a notification to a user device that is configured to alert a legitimate owner, operator, or occupant of the vehicle that the vehicle is not parked in a location that can be monitored by a video camera. Alternatively, or in addition, the operations may include the monitoring unit obtaining and transmitting one or more instructions to a vehicle that instruct the vehicle to navigate to a location that is monitored by a camera.

The process 300 described with reference to FIG. 3 describes multiple determinations that a monitoring unit of the present disclosure is configured to make. Among these determinations are (i) a determination as to whether a vehicle is in a line of sight of one or more cameras and (ii) a determination as to whether a vehicle is visible to one or more cameras. In some implementations, these determinations may be separate determinations that may be performed in series, as described herein, for example, at stages 340, 360. However, in other implementations, these determinations may be performed in a single step. For example, the monitoring unit may determine that a vehicle is both in a line of sight of a camera and visible to the camera if the monitoring unit determines, based on image data generated by one or more cameras, that the vehicle is visible. Accordingly, in some implementations, the monitoring unit may perform a single determination to determine whether the vehicle is visible and, based on that single determination, also determine that the vehicle is within line of sight of the camera. Accordingly, in some implementations, the stages 340, 360 may be performed by a single determination of whether the vehicle is visible.

Figure 4:
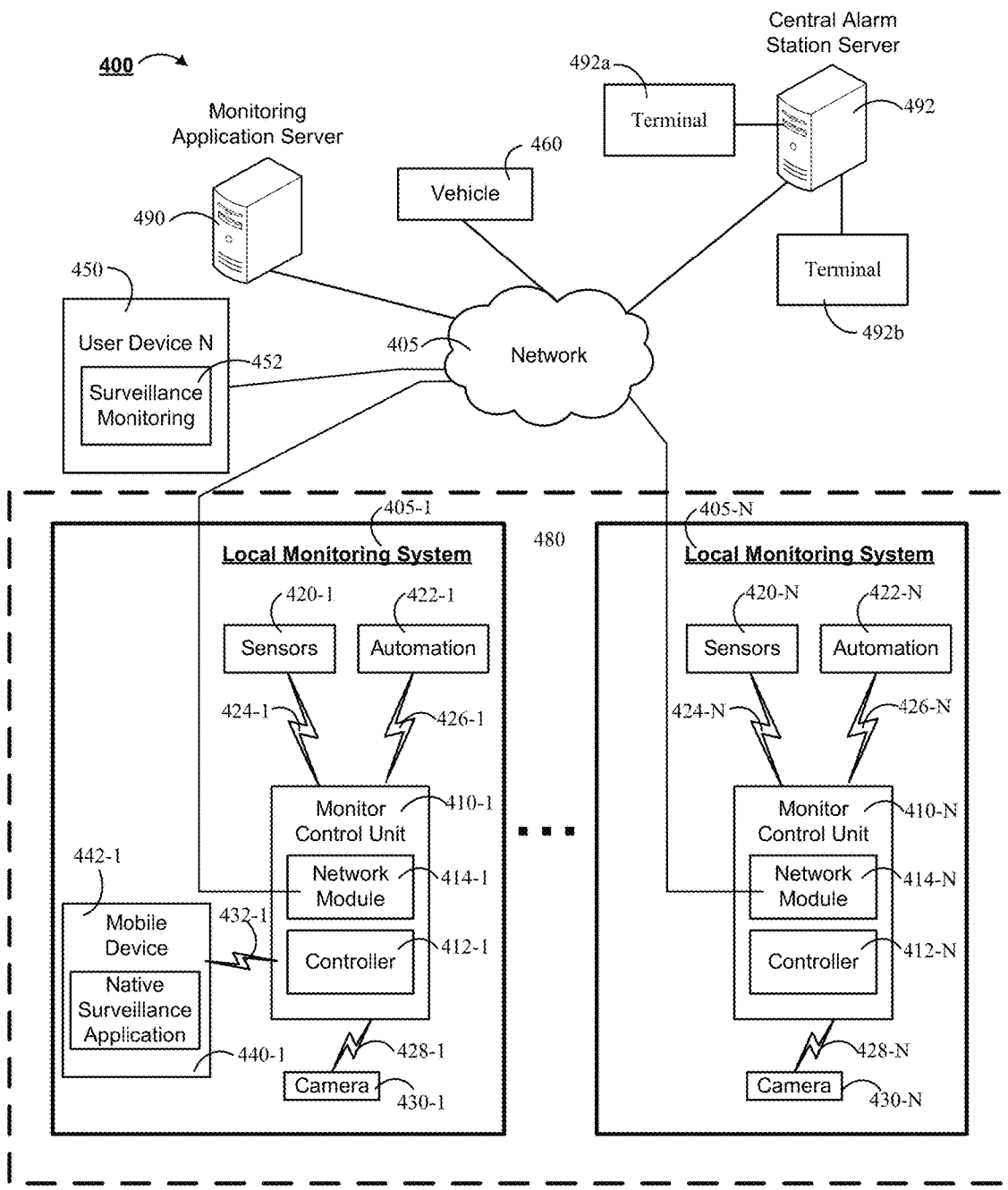
FIG. 4 is a block diagram of components that can be used to implement a monitoring system for monitoring a parked vehicle.

FIG. 4 is a block diagram of components that can be used to implement a monitoring system for monitoring a parked vehicle.

The electronic system 400 includes a network 405, one or more monitoring system control unit 410-1 to 410-N (where N is any positive, non-zero integer), one or more user devices 442-1, 450 a monitoring application server 490, and a central alarm station server 492. In some examples, the network 405 facilitates communications between one or more of the monitoring system control units 410-1, the one or more user devices 442-1, 450, the monitoring application server 490, and the central alarm station server 492.

The network 405 is configured to enable exchange of electronic communications between devices connected to the network 405. For example, the network 405 may be configured to enable exchange of electronic communications between the monitoring system control unit 410-1, the one or more user devices 440-1, 450, the monitoring application server 490, and the central alarm station server 492. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring system control unit 410-1 includes a controller 412-1, a network module 414-1, and a storage unit. The controller 412-1 is configured to control a monitoring system (e.g., a home alarm or security system) that includes the monitoring system control unit 410-1. In some examples, the controller 412-1 may include a processor or other control circuitry configured to execute instructions of a program that controls operation of an alarm system. In these examples, the controller 412-1 may be configured to receive input from sensors, detectors, or other devices included in the alarm system and control operations of devices included in the alarm system or other household devices (e.g., a thermostat, an appliance, lights, etc.). For example, the controller 412-1 may be configured to control operation of the network module 414-1 included in the monitoring system control unit 410-1.

The network module 414-1 is a communication device configured to exchange communications over the network 405. The network module 414-1 may be a wireless communication module configured to exchange wireless communications over the network 405. For example, the network module 414-1 may be a wireless communication device configured to exchange communications over a wireless data channel and a wireless voice channel. In this example, the network module 414-1 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414-1 also may be a wired communication module configured to exchange communications over the network 405 using a wired connection. For instance, the network module 414-1 may be a modem, a network interface card, or another type of network interface device. The network module 414-1 may be an Ethernet network card configured to enable the monitoring system control unit 410-1 to communicate over a local area network and/or the Internet. The network module 414-1 also may be a voiceband modem configured to enable the alarm panel to communicate over the telephone lines of Plain Old Telephone Systems (POTS).

The monitoring system that includes the monitoring system control unit 410-1 includes one or more sensors or detectors. For example, the monitoring system may include multiple sensors 420-1. The sensors 420-1 may include a contact sensor, a motion sensor, a glass break sensor, or any other type of sensor included in an alarm system or security system. The sensors 420-1 also may include an environmental sensor, such as a temperature sensor, a water sensor, a rain sensor, a wind sensor, a light sensor, a smoke detector, a carbon monoxide detector, an air quality sensor, etc. The sensors 420-1 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 420-1 may include a radio-frequency identification (RFID) sensor that identifies a particular article that includes a pre-assigned RFID tag.

The monitoring system control unit 410-1 communicates with the module 422-1 and the camera 430-1 to perform surveillance or monitoring. The module 422-1 is connected to one or more devices that enable home automation control. For instance, the module 422-1 may be connected to one or more lighting systems and may be configured to control operation of the one or more lighting systems. Also, the module 422-1 may be connected to one or more electronic locks at the property and may be configured to control operation of the one or more electronic locks (e.g., control Z-Wave locks using wireless communications in the Z-Wave protocol. Further, the module 422-1 may be connected to one or more appliances at the property and may be configured to control operation of the one or more appliances. The module 422-1 may include multiple modules that are each specific to the type of device being controlled in an automated manner. The module 422-1 may control the one or more devices based on commands received from the monitoring system control unit 410-1. For instance, the module 422-1 may cause a lighting system to illuminate an area to provide a better image of the area when captured by a camera 430-1.

The monitoring system control unit 410-1 can communicate with a vehicle 460, determine whether the vehicle 460 has parked near a property based on location data associated with the vehicle 460, obtain monitoring system data such as image data, sensor data or both from one or more components the local monitoring system 405-1, and determine whether the vehicle can be monitored by a camera 430-1 in the vehicle's 460 parked location.

For example, the monitoring system control unit 410-1 can analyze feeds from one or more cameras 430-1 of the same local monitoring system 405-1. In response to determining that a vehicle 460 has parked, the monitoring system control unit 410-1 can obtain the location information associated with the vehicle 460, obtain monitoring system data such as image data from the cameras 430-1, obtain monitoring system data such as sensor data from one or more sensors 420-1, determine whether the vehicle 460 is in the line of sight of one or more cameras 430-1, determine whether the vehicle 460 is visible to one or more cameras 430-1, determine whether the vehicle 460 should be visible to the one or more cameras 430-1, or a combination thereof.

The monitoring system control unit 410-1 may generate and transmit notifications to the vehicle 460 if the vehicle is determined to be parked in a location that cannot be monitoring by one or more cameras 430-1. In some implementations, when the vehicle 460 is an autonomous vehicle 460, the monitoring system control unit 410-1 may obtain one or instructions that instruct the vehicle 460 to move to a location that can be monitored by one or more cameras 430-1. The monitoring system control unit 410-1 can transmit the one or more instructions to the vehicle 460 to instigate the vehicle 460 to move to a location that can be monitored by one or more cameras 430-1.

The monitoring system control unit 410-1 can be configured to perform each of the one or more operations described with reference to the monitoring system control unit 110 of FIGS. 1 and 2 (and their associated descriptions in the specification) or the monitoring unit of FIG. 3 (and its associated description the specification).

The camera 430-1 may be a video/photographic camera or other type of optical sensing device configured to capture images. For instance, the camera 430-1 may be configured to capture images of an area within a building monitored by the monitoring system control unit 410-1. The camera 430-1 may be configured to capture single, static images of the area and also video images of the area in which multiple images of the area are captured at a relatively high frequency (e.g., thirty images per second). The camera 430-1 may be controlled based on commands received from the monitoring system control unit 410-1.

The camera 430-1 may be triggered by several different types of techniques. For instance, a Passive Infra Red (PIR) motion sensor may be built into the camera 430-1 and used to trigger the camera 430-1 to capture one or more images when motion is detected. The camera 430-1 also may include a microwave motion sensor built into the camera and used to trigger the camera 430-1 to capture one or more images when motion is detected. The camera 430-1 may have a "normally open" or "normally closed" digital input that can trigger capture of one or more images when external sensors (e.g., the sensors 420-1, PIR, door/window, etc.) detect motion or other events. In some implementations, the camera 430-1 receives a command to capture an image when external devices detect motion or another potential alarm event. The camera 430-1 may receive the command from the controller 412-1 or directly from one of the sensors 420-1.

In some examples, the camera 430-1 triggers integrated or external illuminators (e.g., Infra Red, Z-wave controlled "white" lights, lights controlled by the module 422-1, etc.) to improve image quality when the scene is dark. An integrated or separate light sensor may be used to determine if illumination is desired and may result in increased image quality.

The camera 430-1 may be programmed with any combination of time/day schedules, system "arming state", or other variables to determine whether images should be captured or not when triggers occur. The camera 430-1 may enter a low-power mode when not capturing images. In this case, the camera 430-1 may wake periodically to check for inbound messages from the controller 412-1. The camera 430-1 may be powered by internal, replaceable batteries if located remotely from the monitoring control unit 410-1. The camera 430-1 may employ a small solar cell to recharge the battery when light is available. Alternatively, the camera 430-1 may be powered by the controller's 412-1 power supply if the camera 430-1 is co-located with the controller 412-1.

In some implementations, the camera 430-1 communicates directly with the monitoring application server 490 over the Internet. In these implementations, image data captured by the camera 430-1 does not pass through the monitoring system control unit 410-1 and the camera 430-1 receives commands related to operation from the monitoring application server 490.

The sensors 420-1, the module 422-1, and the camera 430-1, communicate with the controller 412-1 over communication links 424-1, 426-1, 428-1, and 432-1. The communication links 424-1, 426-1, 428-1, and 432-1 may be a wired or wireless data pathway configured to transmit signals from the sensors 420-1, the module 422-1, and the camera 430-1 to the controller 412-1. The sensors 420-1, the module 422-1, and the camera 430-1 may continuously transmit sensed values to the controller 412-1, periodically transmit sensed values to the controller 412-1, or transmit sensed values to the controller 412-1 in response to a change in a sensed value.

The communication links 424-1, 426-1, 428-1, and 432-1 may include a local network. The sensors 420-1, the module 422-1, the camera 430-1, and the controller 412-1 may exchange data and commands over the local network. The local network may include 402.11 "Wi-Fi" wireless Ethernet (e.g., using low-power Wi-Fi_33 chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 490 is an electronic device configured to provide monitoring services by exchanging electronic communications with the monitoring system control unit 410-1, the one or more user devices 440-1, 450, and the central alarm station server 492 over the network 405. For example, the monitoring application server 490 may be configured to monitor events (e.g., alarm events) generated by the monitoring system control unit 410-1. In this example, the monitoring application server 490 may exchange electronic communications with the network module 414-1 included in the monitoring system control unit 410-1 to receive information regarding events (e.g., alarm events) detected by the monitoring system control unit 410-1. The monitoring application server 490 also may receive information regarding events (e.g., alarm events) from the one or more user devices 440-1, 450.

In some examples, the monitoring application server 490 may route alarm data received from the network module 414-1 or the one or more user devices 440-1, 450 to the central alarm station server 492. For example, the monitoring application server 260 may transmit the alarm data to the central alarm station server 492 over the network 405.

The monitoring application server 490 may store sensor and image data received from the monitoring system and perform analysis of sensor and image data received from the monitoring system. Based on the analysis, the monitoring application server 490 may communicate with and control aspects of the monitoring system control unit 410-1 or the one or more user devices 440-1, 450.

The vehicle 460 may include a non-autonomous vehicle, a semi-autonomous vehicle, or a fully autonomous vehicle. The vehicle 460 may include a network interface that enables the vehicle 460 to communicate with one or more monitoring system control units 410-1, 410-N, one or more monitoring application servers 490, one or more central alarm station servers, one or more other cloud-services hosted by one or more server computers, any other computer, or the like using the network 405, one or more communication links, or both. For example, the monitoring application server 490 may host one or more cloud-based services that can analyze camera data from multiple different monitoring system control units 410-1 to 410-N and determine, based on location information obtained from the vehicle via the network 405, whether the vehicle 460 has parked in a location that can be monitoring by one or more cameras associated with one or more of the monitoring system control units 410-1 to 410-N. The vehicle 460 may include an application programming interface (API) that enables the vehicle 460 to communicate with the monitoring application server 490, the monitoring system control unit 410-1, or both. Alternatively, or in addition, the API can be included on the monitoring system control unit 410-1, the monitoring application server 490, or both. The vehicle 460 may include an automobile.

In some implementations, the monitoring application server 490 may activate a collaborative network 470 that enables the monitoring application server 490 to obtain monitoring system data such as image data, sensor data or both from multiple different monitoring system 410-1 to 410-N that are part of respective local monitoring systems 405-1 to 405-N. The local monitoring systems 405-1 to 405-N may be installed at different respective properties. Once activated, the collaborative network 470 enables to analyze feeds from cameras 430-1 to 430-N as if the cameras 430-1 to 430-N were part of the same local monitoring network. In response to determining that a vehicle 460 has parked, the monitoring application server 490 can obtain the location information associated with the vehicle 460, obtain monitoring system data such as image data from the cameras 430-1 to 430-N, obtain monitoring system data such as sensor data from one or more sensors 420-1 to 420-N, determine whether the vehicle is in the line of sight of one or more cameras 430-1 to 430-N, determine whether the vehicle is visible to one or more cameras 430-1 to 430-N, determine whether the vehicle should be visible to the one or more cameras 430-1 to 430N, or a combination thereof.

The monitoring application server 490 may generate and transmit notifications to the vehicle 460 if the vehicle is determined to be parked in a location that cannot be monitoring by one or more cameras 430-1, 430-N. In some implementations, when the vehicle 460 is an autonomous vehicle 460, the monitoring application server 490 may obtain one or instructions that instruct the vehicle 460 to move to a location that can be monitored by one or more cameras 430-1, 430-N. The monitoring application server 490 can transmit the one or more instructions to the vehicle 460 to instigate the vehicle 460 to move to a location that can be monitored by one or more cameras 430-1 to 430-N.

The monitoring application server 490 can be configured to perform each of the one or more operations described with reference to the monitoring application server 190 of FIGS. 1 and 2 (and their associated descriptions in the specification) or the monitoring unit of FIG. 3 (and its associated description the specification).

The central alarm station server 492 is an electronic device configured to provide alarm monitoring service by exchanging communications with the monitoring system control unit 410-1, the one or more mobile devices 440-1, 450, and the monitoring application server 490 over the network 405. For example, the central alarm station server 492 may be configured to monitor alarm events generated by the monitoring system control unit 410-1. In this example, the central alarm station server 492 may exchange communications with the network module 414-1 included in the monitoring system control unit 410-1 to receive information regarding alarm events detected by the monitoring system control unit 410-1. The central alarm station server 492 also may receive information regarding alarm events from the one or more mobile devices 440-1, 450 and/or the monitoring application server 490.

The central alarm station server 492 is connected to multiple terminals 492a and 492b. The terminals 492a and 492b may be used by operators to process alarm events. For example, the central alarm station server 492 may route alarm data to the terminals 492a and 492b to enable an operator to process the alarm data. The terminals 492a and 492b may include general-purpose computers (e.g., desktop personal computers, workstations, or laptop computers) that are configured to receive alarm data from a server in the central alarm station server 492 and render a display of information based on the alarm data. For instance, the controller 412-1 may control the network module 414-1 to transmit, to the central alarm station server 492, alarm data indicating that a sensor 420-1 detected a door opening when the monitoring system was armed. The central alarm station server 492 may receive the alarm data and route the alarm data to the terminal 492a for processing by an operator associated with the terminal 492a. The terminal 492a may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 492a and 492b may be mobile devices or devices designed for a specific function. Although FIG. 4 illustrates two terminals for brevity, actual implementations may include more (and, perhaps, many more) terminals.

The one or more user devices 440-1, 450 are devices that host and display user interfaces. For instance, the user device 440-1 is a mobile device that hosts one or more native applications (e.g., the native surveillance application 442-1). The user device 440-1 may be a cellular phone or a non-cellular locally networked device with a display. The user device 440-1 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440-1 may perform functions unrelated to the monitoring system, such as placing personal telephone calls, playing music, playing video, displaying pictures, browsing the Internet, maintaining an electronic calendar, etc.

The user device 440-1 includes a native surveillance application 442-1. The native surveillance application 442-1 refers to a software/firmware program running on the corresponding mobile device that enables the user interface and features described throughout. The user device 440-1 may load or install the native surveillance application 442-1 based on data received over a network or data received from local media. The native surveillance application 442-1 runs on mobile devices platforms, such as iPhone, iPod touch, Blackberry, Google Android, Windows Mobile, etc. The native surveillance application 442-1 enables the user device 440-1 to receive and process image and sensor data from the monitoring system.

The user device 450 may be a general-purpose computer (e.g., a desktop personal computer, a workstation, or a laptop computer) that is configured to communicate with the monitoring application server 490 and/or the monitoring system control unit 410-1 over the network 405. The user device 450 may be configured to display a surveillance monitoring user interface 452 that is generated by the user device 450 or generated by the monitoring application server 490. For example, the user device 450 may be configured to display a user interface (e.g., a web page) provided by the monitoring application server 490 that enables a user to perceive images captured by the camera 430-1 and/or reports related to the monitoring system. Although FIG. 4 illustrates two user devices for brevity, actual implementations may include more (and, perhaps, many more) or fewer user devices.

In some implementations, the one or more user devices 440-1, 450 communicate with and receive monitoring system data from the monitoring system control unit 410-1 using the communication link 438. For instance, the one or more user devices 440-1, 450 may communicate with the monitoring system control unit 410-1 using various local wireless protocols such as Wi-Fi, Bluetooth, Z-Wave, Zig-Bee, HomePlug (Ethernet over powerline), or wired protocols such as Ethernet and USB, to connect the one or more user devices 440-1, 450 to local security and automation equipment. The one or more user devices 440-1, 450 may connect locally to the monitoring system and its sensors and other devices. The local connection may improve the speed of status and control communications because communicating through the network 405 with a remote server (e.g., the monitoring application server 490) may be significantly slower.

Although the one or more user devices 440-1, 450 are shown as communicating with the monitoring system control unit 410-1, the one or more user devices 440-1, 450 may communicate directly with the sensors and other devices controlled by the monitoring system control unit 410-1. In some implementations, the one or more user devices 440-1, 450 replace the monitoring system control unit 410-1 and perform the functions of the monitoring system control unit 410-1 for local monitoring and long range/offsite communication.

In other implementations, the one or more user devices 440-1, 450 receive monitoring system data captured by the monitoring system control unit 410-1 through the network 405. The one or more user devices 440-1, 450 may receive the data from the monitoring system control unit 410-1 through the network 405 or the monitoring application server 490 may relay data received from the monitoring system control unit 410-1 to the one or more user devices 440-1, 450 through the network 405. In this regard, the monitoring application server 490 may facilitate communication between the one or more user devices 440-1, 450 and the monitoring system.

In some implementations, the one or more user devices 440-1, 450 may be configured to switch whether the one or more user devices 440-1, 450 communicate with the monitoring system control unit 410-1 directly (e.g., through link 438) or through the monitoring application server 490 (e.g., through network 405) based on a location of the one or more user devices 440-1, 450. For instance, when the one or more user devices 440-1, 450 are located close to the monitoring system control unit 410-1 and in range to communicate directly with the monitoring system control unit 410-1, the one or more user devices 440-1, 450 use direct communication. When the one or more user devices 440-1, 450 are located far from the monitoring system control unit 410-1 and not in range to communicate directly with the monitoring system control unit 410-1, the one or more user devices 440-1, 450 use communication through the monitoring application server 490.

Although the one or more user devices 440-1, 450 are shown as being connected to the network 405, in some implementations, the one or more user devices 440-1, 450 are not connected to the network 405. In these implementations, the one or more user devices 440-1, 450 communicate directly with one or more of the monitoring system components and no network (e.g., Internet) connection or reliance on remote servers is needed.

In some implementations, the one or more user devices 440-1, 450 are used in conjunction with only local sensors and/or local devices in a house. In these implementations, the system 400 only includes the one or more user devices 440-1, 450, the sensors 420-1, the module 422-1, and the camera 430-1. The one or more user devices 440-1, 450 receive data directly from the sensors 420-1, the module 422-1, and the camera 430-1 and sends data directly to the sensors 420-1, the module 422-1, and the camera 430-1. The one or more user devices 440-1, 450 provide the appropriate interfaces/processing to provide visual surveillance and reporting.

In other implementations, the system 400 further includes network 405 and the sensors 420-1, the module 422-1, and the camera 430-1 are configured to communicate sensor and image data to the one or more user devices 440-1, 450 over network 405 (e.g., the Internet, cellular network, etc.). In yet another implementation, the sensors 420-1, the module 422-1, and the camera 430-1 (or a component, such as a bridge/router) are intelligent enough to change the communication pathway from a direct local pathway when the one or more user devices 440-1, 450 are in close physical proximity to the sensors 420-1, the module 422-1, and the camera 430-1 to a pathway over network 405 when the one or more user devices 440-1, 450 are farther from the sensors 420-1, the module 422-1, and the camera 430-1. In some examples, the system leverages GPS information from the one or more user devices 440-1, 450 to determine whether the one or more user devices 440-1, 450 are close enough to the sensors 420-1, the module 422-1, and the camera 430-1 to use the direct local pathway or whether the one or more user devices 440-1, 450 are far enough from the sensors 420-1, the module 422-1, and the camera 430-1 that the pathway over network 405 is required. In other examples, the system leverages status communications (e.g., pinging) between the one or more user devices 440-1, 450 and the sensors 420-1, the module 422-1, and the camera 430-1 to determine whether communication using the direct local pathway is possible. If communication using the direct local pathway is possible, the one or more user devices 440-1, 450 communicate with the sensors 420-1, the module 422-1, and the camera 430-1 using the direct local pathway. If communication using the direct local pathway is not possible, the one or more user devices 440-1, 450 communicate with the sensors 420-1, the module 422-1, and the camera 430-1 using the pathway over network 405.

In some implementations, the system 400 provides end users with access to images captured by the camera 430-1 to aid in decision making. The system 400 may transmit the images captured by the camera 430-1 over a wireless WAN network to the user devices 440-1, 450. Because transmission over a wireless WAN network may be relatively expensive, the system 400 uses several techniques to reduce costs while providing access to significant levels of useful visual information.

In some implementations, a state of the monitoring system and other events sensed by the monitoring system may be used to enable/disable video/image recording devices (e.g., the camera 430-1). In these implementations, the camera 430-1 may be set to capture images on a periodic basis when the alarm system is armed in an "Away" state, but set not to capture images when the alarm system is armed in a "Stay" state or disarmed. In addition, the camera 430-1 may be triggered to begin capturing images when the alarm system detects an event, such as an alarm event, a door opening event for a door that leads to an area within a field of view of the camera 430-1, or motion in the area within the field of view of the camera 430-1. In other implementations, the camera 430-1 may capture images continuously, but the captured images may be stored or transmitted over a network when needed.

The invention claimed is:

1. A monitoring system for monitoring a property, the monitoring system comprising:
one or more processors; and
one or more storage devices, the one or more storage devices storing instructions that, when executed by the one or more processors, cause the one or more processors to perform operations comprising:
determining, by the monitoring system, whether a vehicle is parked within a predetermined distance of a property;
based on determining, by the monitoring system, that the vehicle is parked within a predetermined distance of the property:
obtaining, by the monitoring system, data from one or more monitoring system components;
determining, by the monitoring system and based on the obtained data, whether the vehicle is parked within a field of view of one or more cameras; and
based on determining, by the monitoring system and based on the obtained data, that the vehicle is not parked within a field of view of the one or more cameras:
determining, by the monitoring system, whether (i) the vehicle should be parked within a field of view of the one or more cameras and (ii) an image captured by the one or more cameras should include a representation of the vehicle; and
based on determining, by the monitoring system, that (i) the vehicle should be parked within a field of view of the one or more cameras and (ii) an image captured by the one or more cameras should include a representation of the vehicle, performing, by the monitoring system, one or more operations to instigate movement of the vehicle to a different location that is (i) within a field of view of the one or more cameras and (ii) where an image captured by the one or more cameras includes a representation of the vehicle.

2. The monitoring system of claim 1, wherein determining, by the monitoring system, whether (i) the vehicle should be parked within a field of view of the one or more cameras and (ii) an image captured by the one or more cameras should include a representation of the vehicle comprises:
determining, by the monitoring system, whether the vehicle is parked in a secure location of property; and
based on determining, by the monitoring system, that the vehicle is parked in a secure location of the property, determining (i) that the vehicle is not to be parked within a field of view of the one or more cameras and (ii) that an image captured by the one or more cameras does not have to include a representation of the vehicle.

3. The monitoring system of claim 2, wherein the secure location of the property includes a garage.

4. The monitoring system of claim 1, wherein determining, by the monitoring system, whether (i) the vehicle should be parked within a field of view of the one or more cameras and (ii) that an image captured by the one or more cameras should include a representation of the vehicle comprises:
determining, by the monitoring system, whether the vehicle is parked in a secure location of the property; and
based on determining, by the monitoring system, that the vehicle is not parked in a secure location of the property, determining (i) that the vehicle is to be parked within a field of view of the one or more camera and (ii) that an image captured by the one or more cameras should include a representation of the vehicle.

5. The monitoring system of claim 1, the operations further comprising:
obtaining additional data from one or more monitoring system components;
determining, based on the additional data, whether the vehicle is parked within a field of view of one or more cameras; and
based on determining, by the monitoring system and based on the additional data, that the vehicle is not parked within a field of view of the one or more cameras:
determining, by the monitoring system and based on the additional data, whether an image captured by the one or more cameras should include a representation of the vehicle; and
based on determining, by the monitoring system and based on the additional data, that an image captured by the one or more cameras should not include a representation of the vehicle, determining, by the monitoring system, to not use the one or more cameras to monitor the parked vehicle.

6. The monitoring system of claim 1, the operations further comprising:
obtaining additional data from one or more monitoring system components;
determining, based on the additional data, whether the vehicle is parked within a field of view of one or more cameras; and
based on determining, by the monitoring system and based on the additional data, that the vehicle is parked within a field of view of the one or more cameras:
determining, by the monitoring system and based on the additional data, whether an image captured by the one or more cameras should include a representation of the vehicle; and
based on determining that an image captured by the one or more cameras should include a representation of the vehicle, determining, by the monitoring system, to use the one or more cameras to monitor the parked vehicle.

7. The monitoring system of claim 6, the operations further comprising:
using the one or more cameras to monitor the vehicle, wherein using the one or more cameras to monitor the vehicle comprises using the one or more cameras to capture one or more videos or images of the vehicle while the vehicle is parked.

8. The monitoring system of claim 1, the operations further comprising:
obtaining additional data from one or more monitoring system components;
determining, based on the additional data, whether the vehicle is parked within a field of view of one or more cameras; and
based on determining, by the monitoring system and based on the additional data, that the vehicle is parked within a field of view of the one or more cameras:
determining, by the monitoring system and based on the additional data, whether an image captured by the one or more cameras includes a representation of the vehicle;
based on determining that an image captured by the one or more cameras does not include a representation of the vehicle, determining, by the monitoring system, whether an image captured by the one or more cameras should include a representation of the vehicle; and
based on determining, by the monitoring system, that an image captured by the one or more cameras should include a representation of the vehicle, performing, by the monitoring system, one or more operations to instigate movement of the vehicle to a different location that is (i) within a field of view of the one or more cameras and (ii) where an image captured by the one or more cameras includes a representation of the vehicle.

9. The monitoring system of claim 1, the operations further comprising:
obtaining additional data from one or more monitoring system components;
determining, based on the additional data, whether the vehicle is parked within a field of view of one or more cameras; and
based on determining, by the monitoring system and based on the additional data, that the vehicle is parked within a field of view of the one or more cameras:
determining, by the monitoring system and based on the additional data, whether an image captured by the one or more cameras includes a representation of the vehicle;
based on determining that an image captured by the one or more cameras does not include a representation of the vehicle, determining, by the monitoring system, whether an image captured by the one or more cameras should include a representation of the vehicle; and
based on determining, by the monitoring system, that an image captured by the one or more cameras should not include a representation of the vehicle, determining, by the monitoring system, to not use the one or more cameras to monitor the parked vehicle.

10. The monitoring system of claim 1, the operations further comprising:
obtaining, by the monitoring system and from the vehicle, data indicating that the vehicle has parked.

11. The monitoring system of claim 1, the operations further comprising:
obtaining, by the monitoring system and from a monitoring system component, data indicating that the vehicle has parked.

12. The monitoring system of claim 1, wherein determining, by the monitoring system, whether the vehicle is parked within a predetermined distance of a property comprises:
determining, by the monitoring system, based on location information received from the vehicle, whether the vehicle is within a predetermined distance of the property.

13. The monitoring system of claim 1, wherein obtaining data from one or more monitoring system components comprises:
obtaining, by the monitoring system, image data that is based on images captured by the one or more cameras installed at the property.

14. The monitoring system of claim 1, wherein determining, based on the obtained data, whether the vehicle is parked within a field of view of the one or more cameras comprises:
determining, by the monitoring system, whether a location of the vehicle falls within a respective range of locations that define respective viewing angles of the one or more cameras.

15. The monitoring system of claim 1, wherein performing, by the monitoring system, one or more operations to instigate movement of the vehicle to a different location that is (i) within a field of view of the one or more cameras and (ii) where an image captured by the one or more cameras includes a representation of the vehicle comprises:
transmitting, by the monitoring system and to a user device, an alert that notifies an occupant of the vehicle that the vehicle is parked in a location that cannot be monitored by the one or more cameras.

16. The monitoring system of claim 1, wherein performing, by the monitoring system, one or more operations to instigate movement of the vehicle to a different location that is (i) within a field of view of the one or more cameras and (ii) where an image captured by the one or more cameras includes a representation of the vehicle comprises:
transmitting, by the monitoring system and to the vehicle, an alert that notifies (i) the vehicle or (ii) an occupant of the vehicle that the vehicle is parked in a location that cannot be monitored by the one or more cameras.

17. A method for monitoring a property, the method comprising:
determining, by the monitoring system, whether a vehicle is parked within a predetermined distance of a property;
based on determining, by the monitoring system, that the vehicle is parked within a predetermined distance of the property:
obtaining, by the monitoring system, data from one or more monitoring system components;
determining, by the monitoring system and based on the obtained data, whether the vehicle is parked within a field of view of one or more cameras; and
based on determining, by the monitoring system and based on the obtained data, that the vehicle is not parked within a field of view of the one or more cameras:
determining, by the monitoring system, whether (i) the vehicle should be parked within a field of view of the one or more cameras and (ii) an image captured by the one or more cameras should include a representation of the vehicle; and
based on determining, by the monitoring system, that (i) the vehicle should be parked within a field of view of the one or more cameras and (ii) an image captured by the one or more cameras should include a representation of the vehicle, performing, by the monitoring system, one or more operations to instigate movement of the vehicle to a different location that is (i) within a field of view of the one or more cameras and (ii) where an image captured by the one or more cameras includes a representation of the vehicle.

18. The method of claim 17, wherein determining, by the monitoring system, whether (i) the vehicle should be parked within a field of view of the one or more camera and (ii) an image captured by the one or more cameras should include a representation of the vehicle comprises:

determining, by the monitoring system, whether the vehicle is parked in a secure location of property; and based on determining, by the monitoring system, that the vehicle is parked in a secure location of the property, determining (i) that the vehicle is not to be parked within a field of view of the one or more cameras and (ii) that an image captured by the one or more cameras does not have to include a representation of the vehicle.

19. The method of claim 17, wherein determining, by the monitoring system, whether (i) the vehicle should be parked within a field of view of the one or more camera and (ii) that an image captured by the one or more cameras should include a representation of the vehicle comprises:

determining, by the monitoring system, whether the vehicle is parked in a secure location of the property; and based on determining, by the monitoring system, that the vehicle is not parked in a secure location of the property, determining (i) that the vehicle is to be parked within a field of view of the one or more camera and (ii) that an image captured by the one or more cameras should include a representation of the vehicle.

20. The method of claim 17, the method further comprising:

obtaining additional data from one or more monitoring system components;

determining, based on the additional data, whether the vehicle is parked within a field of view of one or more cameras; and based on determining, by the monitoring system and based on the additional data, that the vehicle is not parked within a field of view of the one or more cameras:

determining, by the monitoring system and based on the additional data, whether an image captured by the one or more cameras should include a representation of the vehicle; and based on determining, by the monitoring system and based on the additional data, that an image captured by the one or more cameras should not include a representation of the vehicle, determining, by the monitoring system, to not use the one or more cameras to monitor the parked vehicle.

\* \* \* \* \*

UNITED STATES PATENT AND TRADEMARK OFFICE
CERTIFICATE OF CORRECTION

PATENT NO. : 10,474,904 B1
APPLICATION NO. : 16/149096
DATED : November 12, 2019
INVENTOR(S) : Matthew Daniel Correnti Page 1 of 1

It is certified that error appears in the above-identified patent and that said Letters Patent is hereby corrected as shown below:

In the Claims

In Claim 18, Column 31, Line 9 (approx.), delete "camera" and insert -- cameras --, therefor.

In Claim 19, Column 31, Line 23 (approx.), delete "camera" and insert -- cameras --, therefor.

Signed and Sealed this
Ninth Day of June, 2020

Andrei Iancu
*Director of the United States Patent and Trademark Office*